United States Patent [19]

Martin et al.

[11] Patent Number: 5,500,691
[45] Date of Patent: Mar. 19, 1996

[54] REMOTE CONTROL IDENTIFIER SETUP IN A VIDEO SYSTEM HAVING BOTH IR AND RF TRANSMITTERS

[75] Inventors: Jeffrey A. Martin, Escondido; Toshikazu Ido, San Diego, both of Calif.

[73] Assignees: Sony Corporation, Tokyo, Japan; Sony Electronics, Inc., Park Ridge, N.J.

[21] Appl. No.: 368,373

[22] Filed: Jan. 4, 1995

[51] Int. Cl.⁶ .......................................... H04N 5/44
[52] U.S. Cl. .................. 348/734; 359/146; 359/145; 455/152.1
[58] Field of Search ................ 348/734; 455/150.1, 455/151.1, 151.2, 151.4, 352, 353; 340/825.57; 359/142, 145, 146

[56] References Cited

U.S. PATENT DOCUMENTS 4,904,993  2/1990  Sato .................................. 340/825.57
5,386,251  1/1993  Movshovich ......................... 348/734

*Primary Examiner*—Victor R. Kostak
*Assistant Examiner*—Nathan J. Flynn
*Attorney, Agent, or Firm*—Blakely, Sokoloff, Taylor & Zafman

[57] ABSTRACT

A video system is disclosed including a receiver that generates a remote identifier setup display on a television monitor and further including a remote control unit having a radio frequency transmitter and an infrared transmitter. The video system enables a user to enter a remote control identifier for the radio frequency transmitter through the remote identifier setup display using the infrared transmitter. The receiver initially ignores remote command signals received from the radio frequency transmitter until the remote control identifier is entered.

12 Claims, 4 Drawing Sheets

REMOTE CONTROL IDENTIFIER SETUP IN A VIDEO SYSTEM HAVING BOTH IR AND RF TRANSMITTERS

BACKGROUND OF THE INVENTION

1. Field of the Invention

The present invention pertains to the field of television systems. More particularly, this invention relates to a setup mechanism for a remote control identifier in a video system.

2. Art Background

Prior electronic systems such as televisions, video recorders and players, and video receivers commonly provide a remote control mechanism. Such remote control mechanisms typically enable users to control a variety of system functions from a distance. For example, prior television systems commonly include a hand-held remote control unit that enables channel selection and volume control as well as control over other functions. Similarly, prior video cassette recorders typically provide remote control units that enable remote control of record and playback functions as well as channel selection functions.

Some prior electronic systems provide remote control units that employ infrared signals for command communications. Such systems typically include a hand held remote infrared transmitter that communicates with an infrared receiver embedded in a control unit for the system. Such infrared based remote control usually offer the advantage of relatively low cost. However, such infrared based communication typically imposes a limited range between the infrared transmitter and the corresponding infrared receiver. In addition, such infrared communication usually requires line of sight communication between the hand held transmitter and the control unit that contains the infrared receiver.

Other prior electronic systems employ radio frequency based remote control mechanisms. Typically in such systems, a hand held remote control transmitter generates radio frequency command signals in response to user selected functions. The radio frequency command signals are usually received and decoded by a receiver/control unit for the electronic system. Such radio frequency based remote control mechanisms typically provide increased communication range in comparison to infrared based remote control mechanisms. In addition, radio frequency communication is usually not limited to line of sight communication.

Unfortunately, such increased communication range available from radio frequency based remote control mechanisms creates the possibility of interference among systems. For example, the radio frequency transmissions from a given remote control unit may be received by other electronic systems contained within adjacent rooms or buildings. Such stray command signals may initiate undesirable control functions in other electronic systems and provide unnecessary annoyance to the users.

Prior systems usually prevent such remote control interference by allocating a control identifier to each system. Typically, such a control identifier associates a hand-held remote control unit with a corresponding receiver/control unit. In such a system, the hand-held remote control unit transmits the control identifier with each command transmission. Each receiver/control unit responds only to the command signals that include the proper control identifier. Such a mechanism usually prevents such remote control transmitters from inadvertently controlling unintended electronic systems.

Typically, such control identifiers are user selectable over a small range of values. Prior systems usually include mechanical switches or dials that enable a user to set or modify the control identifier. Such mechanical switches or dials are typically included in both the remote control unit and the corresponding receiver/control unit. Unfortunately, such mechanical switches or dials are needlessly cumbersome and typically increase the cost of remote control in such an electronic system.

SUMMARY AND OBJECTS OF THE INVENTION

One object of the present invention is to enable a user to set and modify a control identifier for remote control in an electronics system.

Another object of the present invention is to provide a user interface for a video system that enables selection and modification of a control identifier using a radio frequency or infrared remote control unit.

A further object of the present invention is to provide a user interface that enables a user to select either a radio frequency or an infrared transmitter source as an active source for remote control functions in the electronics system.

These and other objects are provided by a video system comprising a receiver that generates a remote identifier setup display on a television monitor. The video system includes a remote control unit having a radio frequency transmitter and an infrared transmitter. The video system enables a user to enter a remote control identifier for the radio frequency transmitter through the remote identifier setup display using the infrared transmitter. The receiver initially ignores remote command signals received from the radio frequency transmitter until the remote control identifier is entered.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
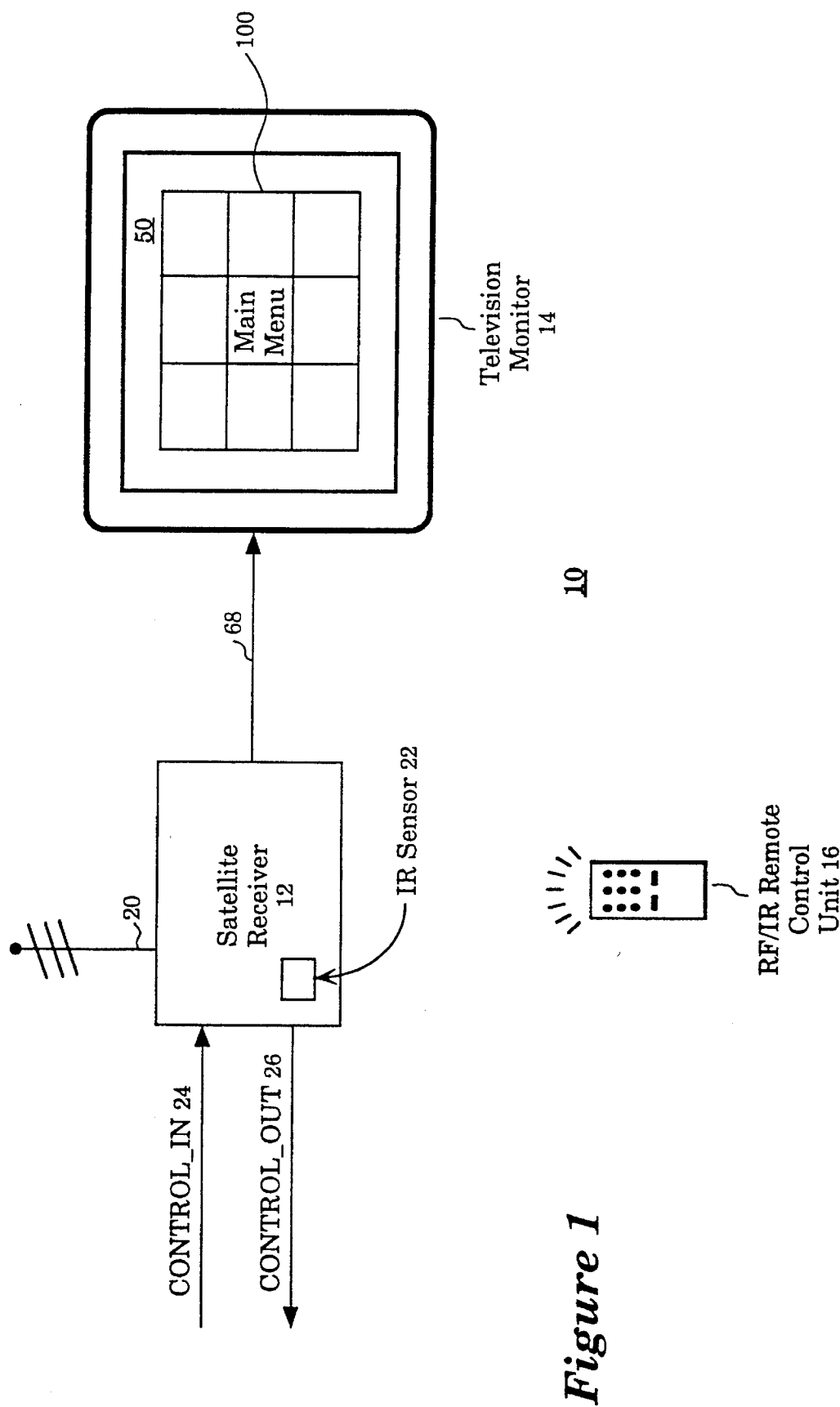
FIG. 1 illustrates a video system for one embodiment that includes a satellite receiver which is controlled via a combined RF and IR remote command unit.

FIG. 1 illustrates a video system 10 for one embodiment. The video system 10 includes a satellite receiver 12 and a television monitor 14. The satellite receiver 12 provides a set of user controllable functions which are remotely controllable. The satellite receiver 12 receives and decodes command signals that originate from a variety of differing sources.

For one embodiment, the user controllable functions may be controlled via a radio frequency and infrared (RF/IR) remote control unit 16. The satellite receiver 12 receives infrared command signals from the RF/IR remote control unit 16 via an IR sensor 22. The IR sensor 22 converts infrared signals into electrical signals for command processing and decoding. The satellite receiver 12 includes an RF antenna 20 that receives radio frequency command signals from the RF/IR remote unit 16. Alternatively, the IR and RF command signals may originate from separate hand-held remote control units each having either an IR or an RF transmitter.

In addition, the satellite receiver 12 accepts commands via a CONTROL_IN signal 24 from other electronic equipment such as video or audio equipment (not shown). The satellite receiver 12 in turn generates a CONTROL_OUT signal 26 to drive other video and audio equipment. The CONTROL_OUT signal 26 reflects command signals received by the satellite receiver 12 from the RF/IR remote control unit 16 or via the CONTROL_IN signal 24.

The satellite receiver 12 generates video images on a display surface 50 of the television monitor 14. The satellite receiver 12 generates a set of video signals 68 to provide images on the display surface 50. The images rendered on the display surface 50 by the satellite receiver 12 include user interface images such as a main menu 100. The main menu 100 enables user control of various setup functions for the satellite receiver 12 via the RF/IR remote control unit 16.

Figure 2:
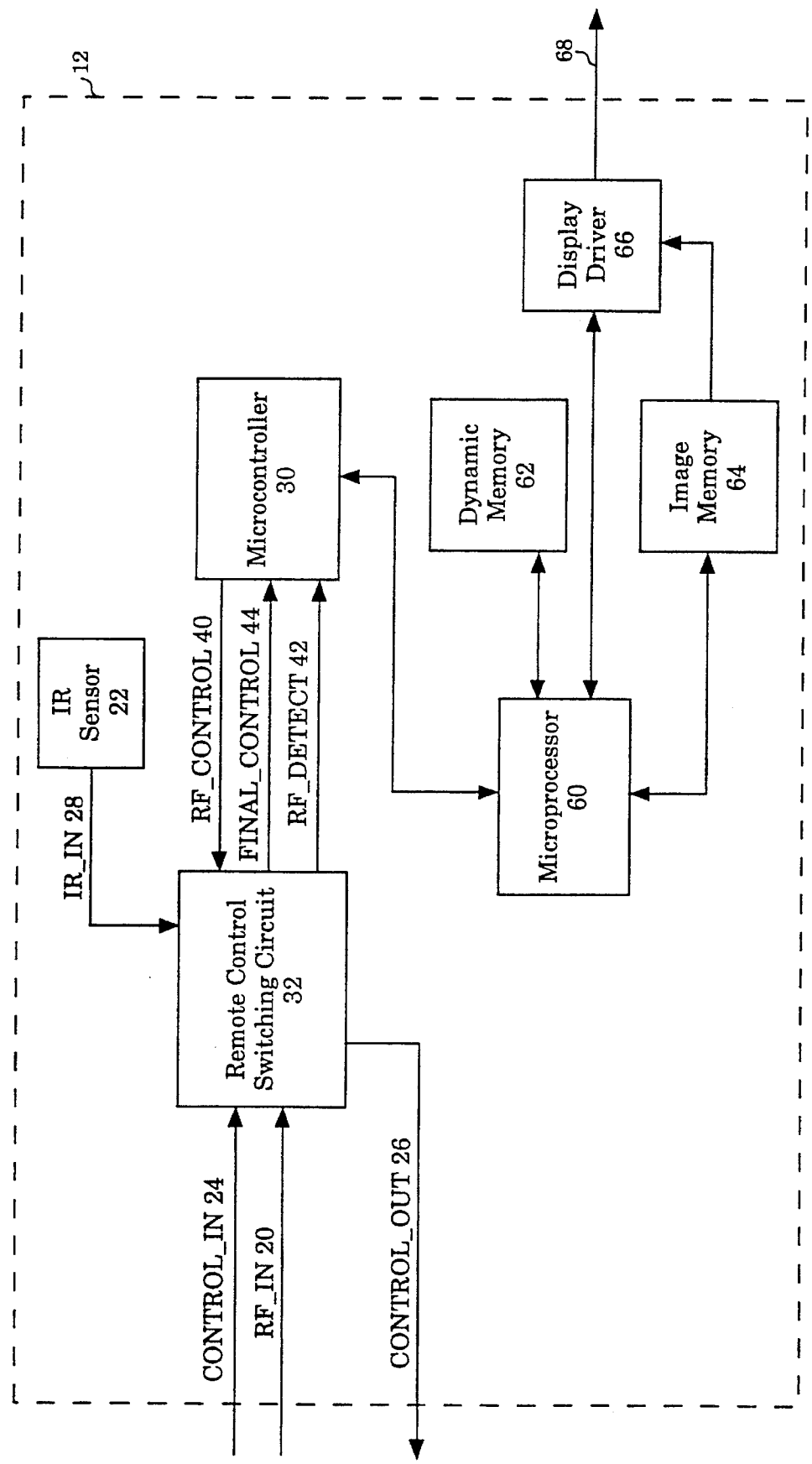
FIG. 2 illustrates the satellite receiver for one embodiment which includes a remote control switching circuit, an infrared sensor, and circuitry for generating displays on the television monitor.

FIG. 2 illustrates the satellite receiver 12 for one embodiment. The satellite receiver 12 includes a microcontroller 30, a remote control switching circuit 32, and the IR sensor 22. The remote control switching circuit 32 receives remote command signals via the CONTROL_IN signal 24 and via an RF_IN signal 20 from the RF antenna 20. The remote control switching circuit 32 also receives remote command signals via an IR_IN signal 28 from the IR sensor 22.

The microcontroller 30 generates an RF_CONTROL signal 40 for the remote control switching circuit 32. The RF_CONTROL signal 40 determines the priority of the RF_IN signal 20 in relation to the IR_IN signal 28 and the CONTROL_IN signal 24. The RF_CONTROL signal 40 is software controllable and either enables or disables remote control functions via the RF_IN signal 20 transmitted by the RF/IR remote control unit 16. The RF_CONTROL signal 40, when low, selects the RF_IN signal 20 as the highest priority, followed by the CONTROL_IN signal 24 and then the IR_IN signal 28. The RF_CONTROL signal 40, when high, selects the CONTROL_IN signal 24 as the highest priority, followed by the IR_IN signal 28, while the RF_IN signal 20 is ignored.

The remote control switching circuit 32 combines the CONTROL_IN signal 24 with the RF_IN signal 20 and the IR_IN signal 28 according to the priority indicated by the RF_CONTROL signal 40. The remote control switching circuit 32 generates a FINAL_CONTROL signal 44 that provides a combination of the CONTROL_IN signal 24 with the RF_IN signal 20 sensed by the RF antenna 20 and the IR_IN signal 28 sensed by the IR sensor 22.

The remote control switching circuit 32 also generates an RF_DETECT signal 42 that indicates whether a remote radio frequency command signal is being received from the RF/IR remote control unit 16 via the RF antenna 20. The microcontroller 30 uses the RF_DETECT signal 42 to determine whether to test the FINAL_CONTROL signal 44 for the proper control identifier security code for RF communication. The remote control switching circuit 32 generates a CONTROL_OUT signal 26 as a combination of the CONTROL_IN signal 24 with the IR_IN signal 28 sensed by the IR sensor 22.

The satellite receiver 12 further comprises a microprocessor 60, a dynamic memory 62, an image memory 64 and a display driver 66. The microprocessor 60 receives decoded commands from the microcontroller 30. The commands originate from the RF/IR remote control unit 16 or the CONTROL_IN signal 24. The microprocessor 60 uses the decoded commands to control user interface displays on the display surface 50 through the display driver 66.

The microprocessor 60 renders the user interface displays including the main menu 100 and other menu and window displays into the image memory 64. The images in the image memory 64 are transferred to the display driver 66. The display driver 66 then generates the video signals 68 that drive the television monitor 14.

The microprocessor 60 stores a control identifier for the RF/IR remote control unit 16 in the dynamic memory 62. The microprocessor 60 implements a user interface function on the display surface 50 of the television monitor 14 that enables a user to alter the control identifier stored in the static memory 62 via the RF/IR remote control unit 16.

Figure 3:
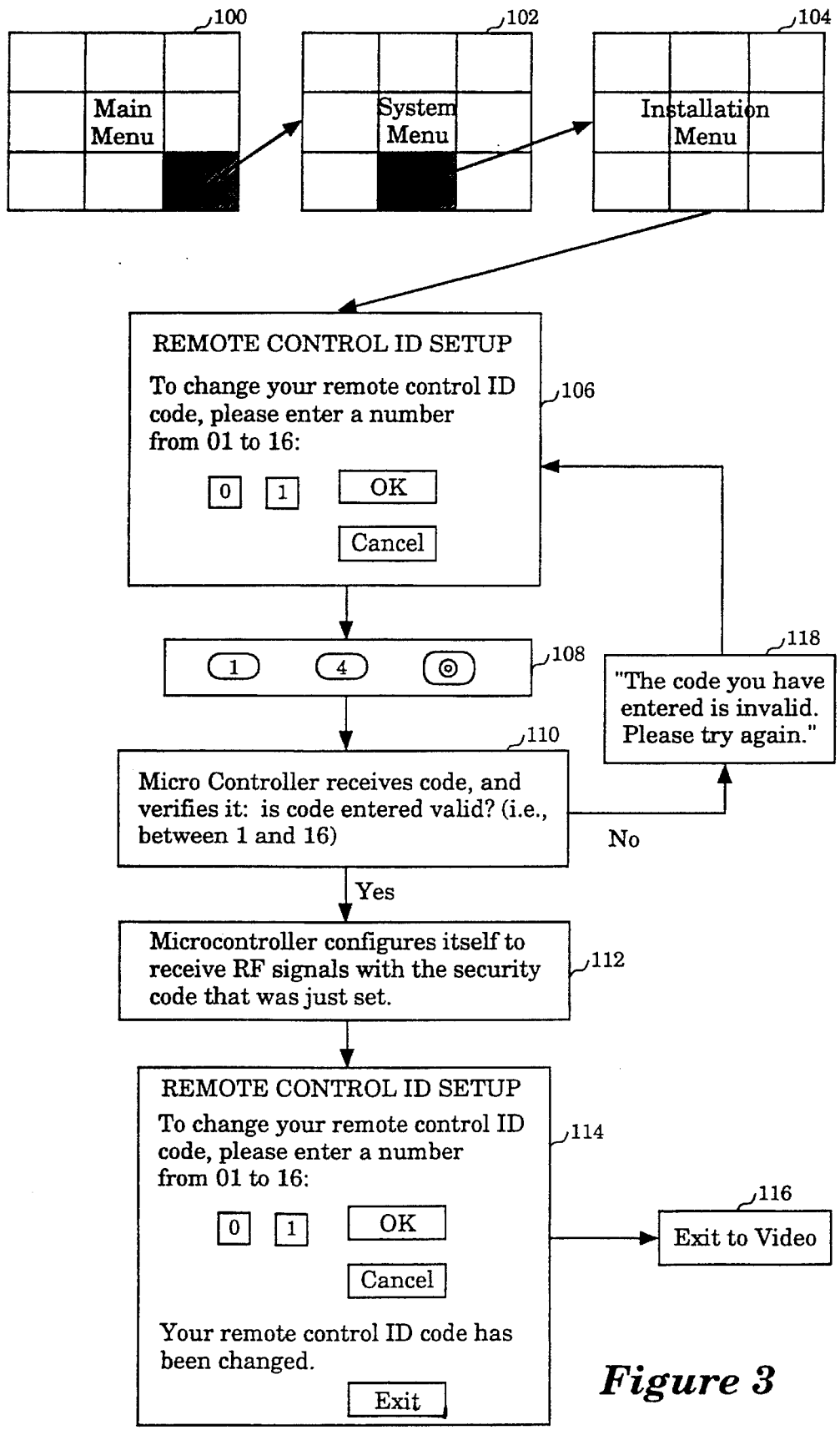
FIG. 3 illustrates a user interface for setting a control identifier for the RF/IR remote control unit for one embodiment.

FIG. 3 illustrates a user interface for setting a control identifier for the RF/IR remote control unit 16 for one embodiment. Initially, the microprocessor 60 displays the main menu 100 on the display surface 50. In addition, the unit is factory preset so that the microprocessor 60 initially drives the RF_CONTROL signal 40 high. This disables the RF_IN signal 20 and thereby enable command entry via the IR communication channel of the RF/IR remote control unit 16.

The user then employs the RF/IR remote control unit 16 to select a system menu 102 from the main menu 100 using the IR communication link to the IR sensor 22. Thereafter, the user selects an installation menu 104 from the system menu 102 via the IR communication link of the RF/IR remote control unit 16. The user then selects a remote control identifier setup display 106 from the installation menu 104.

The microprocessor 60 generates the remote control identifier setup display 106 on the display surface 50. The remote control identifier setup display 106 enables a user to select a remote control identifier code via the IR communication link from the RF/IR remote control unit 16. At block 108, the user selects a remote control identifier code equal to 14 via the RF/IR remote control unit 16 in the example shown.

At block 110, the microcontroller 30 receives and verifies the validity of the control identifier code entered at block 108. If the control identifier code entered at block 108 is valid then control proceeds to block 112. At block 112 the microcontroller configures the satellite receiver 12 to receive and process only the RF signals having a security code equal to 14 according to the user entry at block 108. Thereafter, the microcontroller 30 ignores RF command signals that do not contain the control identifier of 14.

The microprocessor 60 then displays a remote control identifier setup display 114 that indicates that the control identifier code has been changed. Thereafter at block 116, the microprocessor 60 exits the setup identifier user interface function and displays normal video on the display surface 50 of the television monitor 14.

If an invalid control identifier was entered at block 108 then control proceeds from block 110 to block 118. For one embodiment, the control identifier is invalid if outside a predetermined range of 1–16. At block 118 an invalid code message is displayed on the display surface 50. Thereafter, the microprocessor 60 redisplays the remote control identifier setup display 106 on the display surface 50 to enable another entry by the user.

Figure 4:
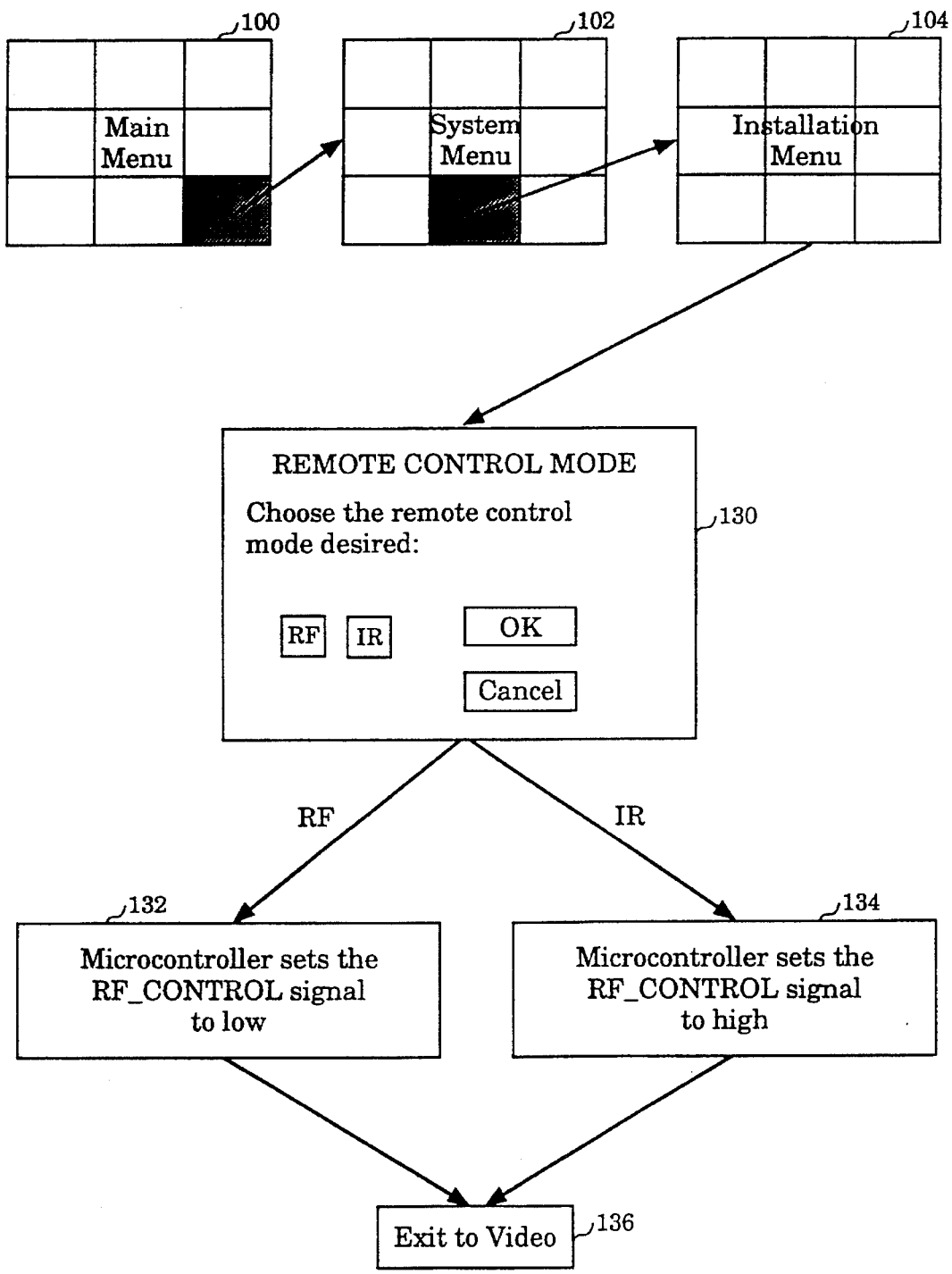
FIG. 4 illustrates a user interface function that enables a user to select from between RF and IR communication for primary communication between the RF/IR remote control unit and the satellite receiver.

FIG. 4 illustrates a user interface function that enables a user to select from among the RF and the IR communication channels as the active communication link between the RF/IR remote control unit 16 and the satellite receiver 12. Initially, the microprocessor 60 displays the main menu 100 on the display surface 50. The RF_CONTROL signal 40 may be either high or low thereby enabling or disabling RF communication from the RF/IR remote control unit 16.

The user then employs the RF/IR remote control unit 16 to select the system menu 102 from the main menu 100, and then to select the installation menu 104 and then to select a remote control mode display 130 from the installation menu 104. The microprocessor 60 generates the remote control mode display 130 on the display surface 50.

The remote control mode display 130 enables a user to select either an RF or an IR control mode for communication with the RF/IR remote control unit 16. If the user selects the RF remote control mode then control proceeds to block 132. At block 132 the microcontroller 30 sets the RF_CONTROL signal 40 to a low level to enable the RF control link between the RF/IR remote control unit 16 and the satellite receiver 12.

On the other hand, if the user selects the IR remote control mode through the remote control display 130 then control proceeds to block 134. At block 134 the microcontroller 30 sets the RF_CONTROL signal 40 to a high level to disable the RF channel and to select the IR channel to the IR sensor 22 of the satellite receiver 12. Thereafter, at block 136 the microprocessor 60 generates a normal video display on the display surface 50 of the television monitor 14.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A video system comprising a receiver that generates a remote identifier setup display on a television monitor and further comprising a remote control unit having a radio frequency transmitter and an infrared transmitter that enables a user to enter a remote control identifier for the radio frequency transmitter through the remote identifier setup display using the infrared transmitter.

2. The video system of claim 1, wherein the receiver initially ignores remote command signals received from the radio frequency transmitter until the remote control identifier is entered.

3. The video system of claim 2, wherein the receiver ignores remote command signals received from the radio frequency transmitter unless the remote commands signals include the remote control identifier.

4. The video system of claim 1, wherein the receiver generates a remote control mode display on the television monitor that enables the user to select either the infrared or the radio frequency transmitter as a primary source for receiving remote command signals for the video system.

5. A method for setting up a remote identifier for a remote control unit in a video system, comprising the steps of:

generating a setup display for the remote identifier such that the setup display enables a user to select the remote identifier via the remote control unit having a radio frequency transmitter and an infrared transmitter;

receiving an infrared signal from the infrared transmitter of the remote control unit such that the infrared signal selects the remote identifier for the radio frequency transmitter through the remote identifier setup display.

6. The method of claim 5, further comprising the step of initially ignoring remote command signals received from the radio frequency transmitter until the remote identifier is selected.

7. The method of claim 6, further comprising the step of ignoring remote command signals received from the radio frequency transmitter unless the remote commands signals include the remote identifier.

8. The method of claim 5, further comprising the step of generating a remote control mode display that enables the user to select either the infrared or the radio frequency transmitter as a primary source for receiving remote command signals for the video system.

9. An apparatus for setting up a remote identifier for a remote control unit in a video system, comprising:

means for generating a setup display for the remote identifier such that the setup display enables a user to select the remote identifier via the remote control unit having a radio frequency transmitter and an infrared transmitter;

means for receiving an infrared signal from the infrared transmitter of the remote control unit such that the infrared signal selects the remote identifier for the radio frequency transmitter through the remote identifier setup display.

10. The apparatus of claim 9, further comprising means for initially ignoring remote command signals received from the radio frequency transmitter until the remote identifier is selected.

11. The apparatus of claim 10, further comprising means for ignoring remote command signals received from the radio frequency transmitter unless the remote commands signals include the remote identifier.

12. The apparatus of claim 9, further comprising means for generating a remote control mode display that enables the user to select either the infrared or the radio frequency transmitter as a primary source for receiving remote command signals for the video system.

* * * * *